United States Patent
Johnston et al.

(10) Patent No.: US 9,020,745 B2
(45) Date of Patent: Apr. 28, 2015

(54) BUSINESS DATA DISPLAY AND POSITION CORRECTION IN STREET-SIDE IMAGERY

(75) Inventors: Carolyn P. Johnston, Redmond, WA (US); Manuel Reyes-Gomez, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1070 days.

(21) Appl. No.: 12/414,429

(22) Filed: Mar. 30, 2009

(65) Prior Publication Data

US 2010/0250109 A1 Sep. 30, 2010

(51) Int. Cl.
| | |
|---|---|
| *G08G 1/123* | (2006.01) |
| *G06T 17/05* | (2011.01) |
| *G01C 21/36* | (2006.01) |
| *G06T 19/00* | (2011.01) |
| *G06Q 30/02* | (2012.01) |

(52) U.S. Cl.
CPC ............ *G06T 17/05* (2013.01); *G01C 21/3679* (2013.01); *G06T 19/006* (2013.01); *G06Q 30/0261* (2013.01)

(58) Field of Classification Search
CPC .................................................. G01C 21/3679
USPC .................................................. 701/200, 207
See application file for complete search history.

(56) References Cited

U.S. PATENT DOCUMENTS

| | | | |
|---|---|---|---|
| 6,577,714 B1 | 6/2003 | Darcie et al. | |
| 7,228,123 B2 | 6/2007 | Moursund et al. | |
| 7,228,210 B2 | 6/2007 | Davis et al. | |
| 7,292,936 B2 | 11/2007 | Furukawa | |
| 7,388,519 B1* | 6/2008 | Kreft | 340/995.24 |
| 7,430,473 B2 | 9/2008 | Foo et al. | |
| 7,589,628 B1* | 9/2009 | Brady, Jr. | 340/539.11 |
| 2004/0001114 A1* | 1/2004 | Fuchs et al. | 345/855 |
| 2005/0034074 A1* | 2/2005 | Munson et al. | 715/712 |
| 2006/0238383 A1* | 10/2006 | Kimchi et al. | 340/995.1 |
| 2007/0043504 A1 | 2/2007 | Dorfman et al. | |
| 2007/0076920 A1* | 4/2007 | Ofek | 382/113 |
| 2007/0124064 A1* | 5/2007 | Fukui et al. | 701/208 |
| 2007/0150186 A1* | 6/2007 | Ingulsrud | 701/211 |
| 2007/0220174 A1* | 9/2007 | Abhyanker | 709/250 |

(Continued)

OTHER PUBLICATIONS

ArcGIS 3D Analyst Tutorial documentation, retrieved Jul. 2, 2008.*

(Continued)

*Primary Examiner* — Mark Holcomb
*Assistant Examiner* — Jonathan K Ng
(74) *Attorney, Agent, or Firm* — Steven Spellman; Jim Ross; Mickey Minhas (57) ABSTRACT

A separate panel may be used to display business icons near images of business entries, if the GIS does not include a business's front door geolocation. Users may place icons that represent business entities near the entrances to the entity. Also, a concise but extensive display of business listing data (e.g., reviews, summaries, services, hours, etc.) in the display near the geolocation and the presentation of further information upon user actions such as a mouse-overs, may avoid browsing away from the viewing application in order to learn more about the business.

20 Claims, 5 Drawing Sheets

(56) References Cited

U.S. PATENT DOCUMENTS

| | | | |
|---|---|---|---|
| 2008/0004795 A1 | 1/2008 | Pun | |
| 2008/0059055 A1* | 3/2008 | Geelen et al. | 701/201 |
| 2008/0120023 A1 | 5/2008 | Ofek | |
| 2008/0221843 A1* | 9/2008 | Shenkar et al. | 703/1 |
| 2009/0179895 A1* | 7/2009 | Zhu et al. | 345/424 |
| 2010/0119102 A1* | 5/2010 | Laake | 382/100 |
| 2011/0112762 A1* | 5/2011 | Gruijters et al. | 701/208 |

OTHER PUBLICATIONS

ArcGIS 9, Using Military Overlay Editor (MOLE) 9.1 for ArcGIS, Environmental Systems Research Institute, Inc., 2005.*

Peerbocus et al., A Methodology for Updating Geographic Databases using Map Versions, 2002, Symposium on Geospatial Theory, Processing, and Applications, Ottawa 2002, pp. 305-320.*

"StreetPro US," http://www.mapinfo.com/products/data/street-data/streetpro-us.

"Google Maps Now with 360 Streetside Views," http://www.techcrunch.com/2007/05/29/google-maps-now-with-360-streetside-views/.

"Microsoft Virtual Earth," http://psjetg.blu.livefilestore.com/y1pumvSJcUlgC0plIrtsn9OGCvlgjIVyt7q1g7EBDVck0f4SY2RwbqHWEv0eRWzFokr-T0tFGtma78/Virtual%20Earth%20Overview.pdf?download.

* cited by examiner

BUSINESS DATA DISPLAY AND POSITION CORRECTION IN STREET-SIDE IMAGERY

BACKGROUND

Computerized mapping products have simplified navigation by combining numerous data sources. For example, visual representations of areas on the earth (e.g., graphical maps, aerial, human-scale or street-side, and other image data), may be combined with geographic coordinate system data (e.g., latitude and longitude, vertical datum, Cartesian coordinates, survey data, global positioning system (GPS) data, etc.) to develop computerized maps. Further, the geographic coordinate system data itself may be used to create a computerized representation of an area. As geographic coordinate system data and image data becomes more accurate and widely available, detailed maps have become readily available for use on a variety of computerized devices.

Geographic Information Systems (GIS) integrate, store, edit, analyze, share, and display geographic data, for example, street addresses or geodetic datum such as lat/long coordinates. In a more generic sense, GIS applications are tools that allow users to create interactive queries (user created searches), analyze spatial information, edit data, maps, and present the results of all these operations, often from several different views of a digitized map (e.g., a graphical image, orthorectified aerial imagery, oblique aerial imagery, or human-scale/street level imagery). The images in the GIS often use a technique generally referred to as "geocoding" to calculate geographic coordinates (e.g., lat/long) from other geographic data, such as street addresses, or zip codes. With geographic coordinates, the features can be mapped and entered into a GIS and displayed, or the coordinates can be embedded into media such as digital imagery via geotagging.

Each point on the map or image includes a numeric value representing a three-dimensional point. Reverse geocoding is the opposite: finding an associated textual location such as a street address, from geographic coordinates. In a typical GIS, a user may enter a street address and the GIS will access geographic data to display an indication or "geolocation" of that address on a digital image, map, or other illustration on a display of a computing device. However, because of the errors and inaccuracies of the geographic data described above, a geocoded indication of the street address on the illustration often does not provide useful information to the user. For example, the geocoder may locate a street address to within a several meters (e.g., a half block or so), but often lacks the detailed data to accurately locate a usable location for the address, such as a business front door, a suite location, a floor location, etc. Further complicating the display of the information is that a GIS often includes much more information than can be displayed for listed businesses near the business' geolocation (e.g., hours, menus, reviews, payment options, etc.).

SUMMARY

In a map, street-view, or driving directions application of a GIS, business listing text data may be automatically presented in an accurate map position corresponding to the business' street address. In particular, complications due to inaccuracies in geocoding, and the lack of separate addresses for businesses residing at the same address, but within different suites, units, apartments, etc., may be eliminated by allowing correction or "fine tuning" of a business geolocation by individual users. Business listing and other data may then be concisely displayed in an accurate geolocation to permit in-place browsing and walking or driving navigation to an address while minimizing browsing outside of the GIS application.

In some embodiments, a separate panel may be used to display business icons near images of business entries, if the GIS does not include a business's front door geolocation, to prevent deliberate placement of a business location in an incorrect geolocation, or to prevent "stacked" icons for a single geolocation. Image depth information may also be used to enable 3D localization of businesses from user placement of icons in human-scale/streetside imagery. Also, a concise but extensive display of business listing data (e.g., reviews, summaries, services, hours, etc.) in the display near the geolocation and the presentation of further information upon user actions such as a mouse-overs, may avoid browsing away from the viewing application in order to learn more about the business.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance with the present invention, further discussion of such software and ICs, if any, will be limited to the essentials with respect to the principles and concepts of the preferred embodiments.

Figure 1:
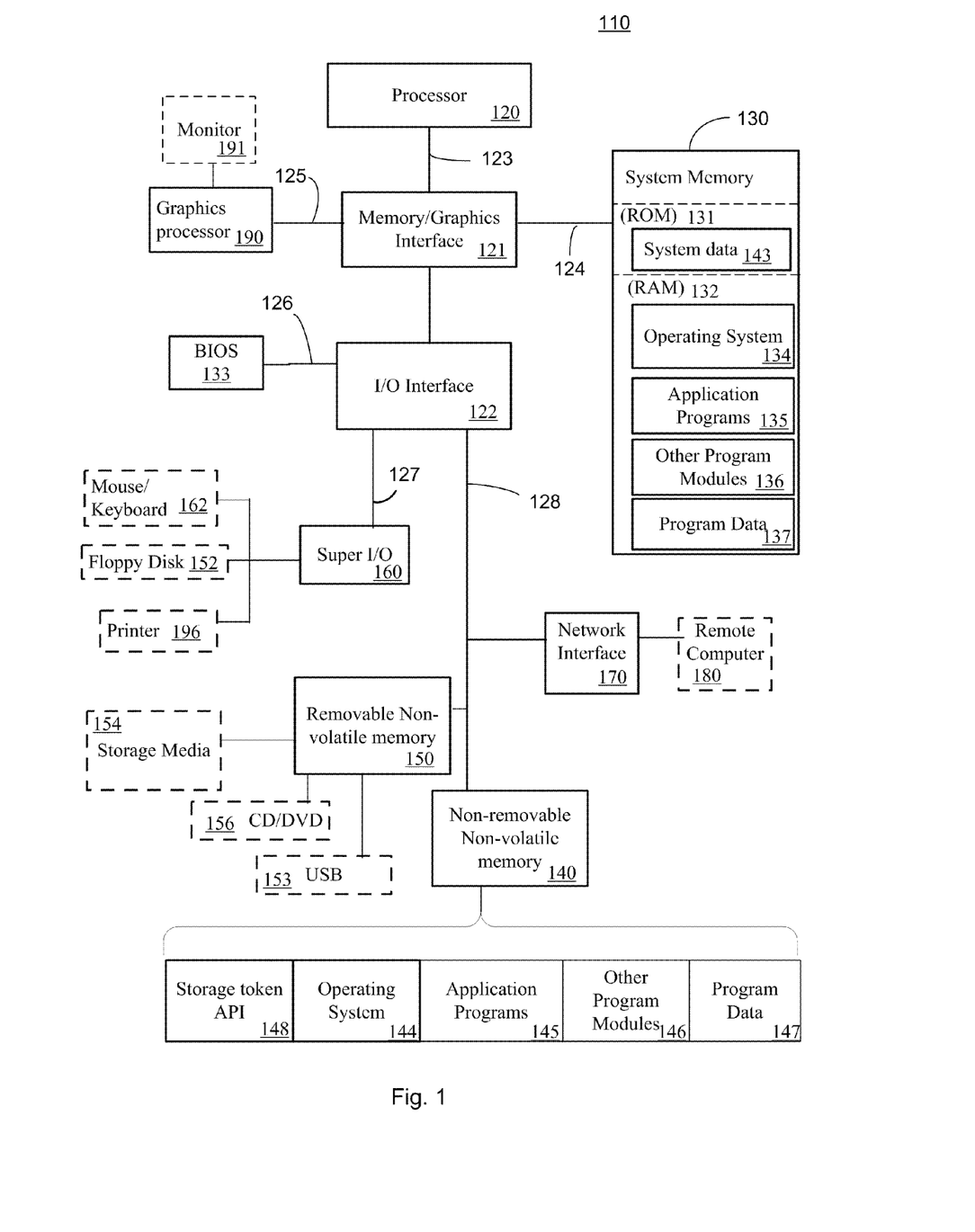
FIG. 1 is a block diagram of a general purpose computing device suitable for hosting a GIS configured as described herein.

With reference to FIG. 1, an exemplary system for implementing the claimed method and apparatus for displaying business data in an accurate geolocation using a GIS includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect—Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

In further embodiments, an application program 135, 145 may include a Geographic Information Systems (GIS), as described herein, and the program data 137,147 may include business listings in a data store such as a database or other storage. The computer 110 may also be in network communication with a GIS that is a remote computer 180 that may be configured substantially the same as the computer 110.

Figure 2:
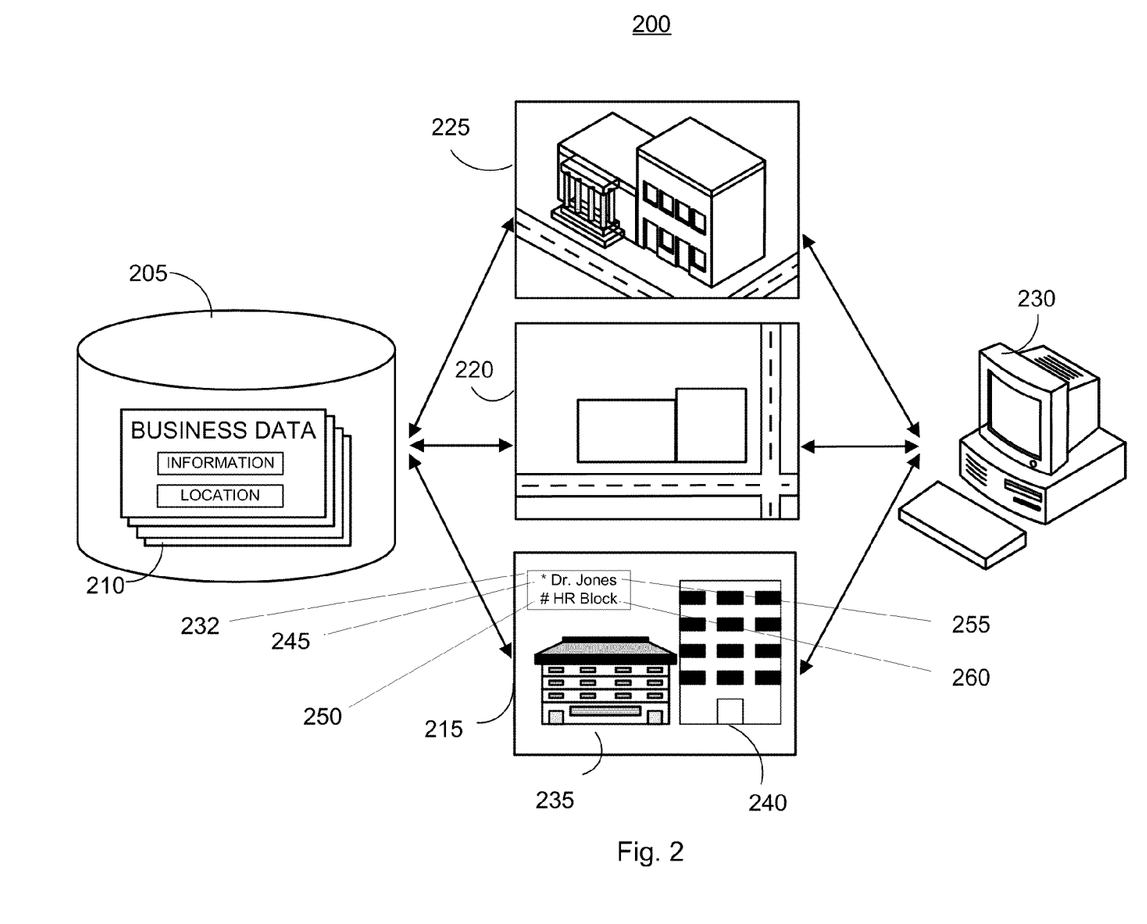
FIG. 2 is a block diagram of a GIS as described herein.

FIG. 2 is an illustration of what occurs in one embodiments of the method. block diagram 200 of one embodiment of a method of or system for adding detail to an electronic image. Data 205, which may be business data, such as business information or location, may be stored in a memory, such as a database. The database 205 may store data on a variety of images 210. An electronic image may be at a street level 215 (human-scale/street-level imagery), from an orthorectified aerial image 220 (a projection onto ground coordinates from images looking straight down from an airplane), or an oblique angle 225 (i.e. taken from an airplane with a camera looking down and 45 degrees forward).

A user at a computer 230 may review the image 215-225. Data that relates to the images 215-225 may be displayed in a separate window 232 of the images 215-225. For example, a strip mall may have several tenants and the data may not be clear as to which location in the strip mall belongs to which business, or more specifically, which doorway belongs to which business. The user may have useful knowledge related to the image 215-225, such as which doorway belongs to which business. The user may drag an icon 245 250 representing the business to the proper doorway. If the user is trusted or a significant number of other users assign the same icon to the same doorway, the location of the doorway and the related data may be stored in a memory 205 such as a database 210. Further requests for the image 215 225 may illustrate the doorways as labeled. In addition, more data 205 may be available, such as location, contact numbers, URL, etc. In some embodiments, the method may attempt to place the icons 245 250 and the user may have the option to adjust the location to be more accurate.

Figure 3:
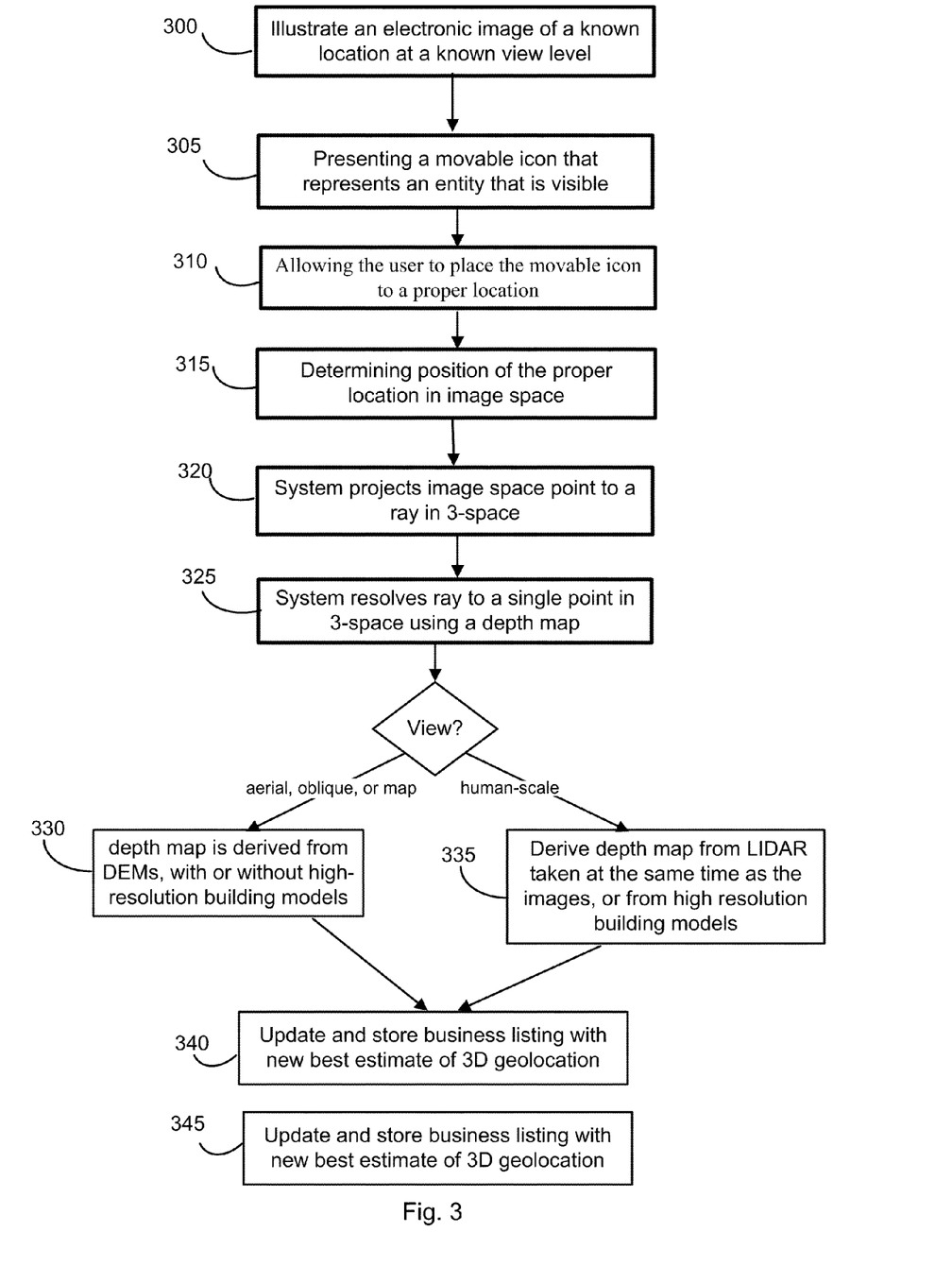
FIG. 3 is a flow chart of one embodiment of a method for updating the geolocation corresponding to a street address.

FIG. 3 may illustrate a method of adding detail 205 (FIG. 2) to an electronic image 215-225. At block 300, an electronic image 215-225 illustrating a location at a known view level of to a user. As mentioned previously, the electronic image 215-225 may be at a street level 215 (human-scale/street-level imagery), from an orthorectified aerial image 220 (a projection onto ground coordinates from images looking straight down from an airplane), or an oblique angle 225 (i.e. taken from an airplane with a camera looking down and 45 degrees forward). The electronic image 215-225 may be made up of object 235, 240. The objects 235 240 may be buildings such as strip malls or multi-story building. The entity 255 260 may be a business. Each of the objects 235 240 may have numerous entities 255 260 which are related to displayed movable icons 245 250. For example, entity (Dr. Jones) 255 may use the "*" icon 245 and the entity 260 (HR Block) may use the "#" icon 250.

At block 305, a movable icon 245 250 that represents an entity 255 260 (Dr. Jones, HR Block) that is visible at the view level may be displayed. The display may be in a separate display window 232 or it may be displayed in a different font. The icon 245 250 may be a representation of an entity 255 260, meaning that where the icon 245 250 is dragged, the concept is that the entity 255 260 flows with the icon 245 250. As an example, if the icon 245 is place on a doorway on building 235, the entity 255 resides in the building 235.

At block 310, the user is allowed to place the movable icon 245 250 to a proper location on the electronic image. The proper location may be the location that the user knows as being the location of the entity 255 260 (Dr. Jones, HR Block). In FIG. 2, a user may drag the icon 245 to be on the first doorway of building 235 to indicate that the entity 255 (Dr. Jones) is located in the building 235.

In some embodiments, the user is trusted and the placement is taken as accurate. In other embodiments, the user may not be known or may not be trusted and the placement of the icon may be temporary or stored until a trusted user validates the placement. In another embodiment, once a significant number of unknown or un-trusted users have validated a placement, the placement may be made permanent. Further, a trusted user may be able to correct a mistaken placement. For example, an owner of a business may be able to correct the placement of an icon 245 250 for that user's business.

At block 315, the position of the proper location in the electronic image 215-225 space may be determined. The user may be viewing an image 215-225 of the area surrounding the business 235 240 whose position he will update. Again, the view might consist of human-scale 215, oblique 225, or aerial imagery 220. The image 215-225 may also consist of a geo-referenced image created using a synthetic world geometry. The important feature of this image 215-225 is that there is a mapping defined from the image space to three dimensions, taking each point in image space to a ray in 3D whose geo-coordinates are known.

At block 320, a ray may be projected from the position of the icon 245 250 toward objects in the electronic image 215-225 in three dimensions. For a human-scale image 215, this ray emanates from the camera center through the specified point in the image, such as the doorway. For an oblique image 225, the ray emanates forward from the camera center through the specified point on the ground. For the orthorectified aerial image 220, the ray is normal to the earth's surface at the specified point in the image. The user simply moves the business icon 245 250 to the desired location in the image 215-225 being viewed. In application, if the object is a multi-story building 240, the ray may point toward a floor of the multistory building and the icons may be displayed that relate to entities on or near the floors pointed to by the ray.

At block 325, the 3-d proper location of the entity may be resolved using one or more depth maps associated with the electronic image. In order to specify a single geo-coordinate for the business front door geo-location, an additional data source may be needed. For each image 215 225 view used in the system, there may be an auxiliary image with the same (synthetic or real) coordinate system as the viewing image, giving the depth of each point in the image. The method may resolve the ray to a single point in 3D space by determining the intersection of the ray with the surface of the object 235 240 defined by the depth map.

If the image 215-225 illustration is a street level illustration 215, at block 335 the depth map is created using LIDAR at a similar street level. The LIDAR measurements may be taken at the same time as the street level illustration. If the image 215-225 illustration is an aerial image 220, an oblique image 225 or an overhead map image, at block 330, the depth map may be created using digital elevation models. For example, if LIDAR indicates a building 235 240 is 40 feet from the street and the icon 245 250 is placed on the building 235 240, assuming the street location in space is known, the location of the icon 245 250 and related entity can be placed in space.

At block 340, the proper location of the entity may be stored in a memory 205. At block 345, the proper location may be used to identify the proper location of the entity 245 250 in future electronic images. If the entities are displayed on images, if the placed movable icon 245 250 is selected, additional information may be displayed about the entity that is represented by the selected movable icon 245 250. The additional information may be displayed in an additional window 232. The additional information may be a URL for the entity, a summary review of the entity, contact information for the entity and summary information for the entity.

Figure 4A:
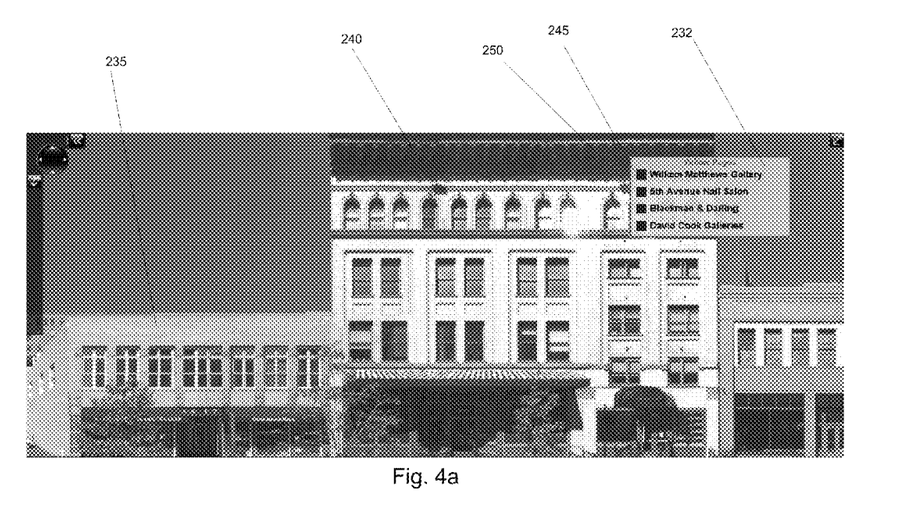
FIG. 4a is street level view of a plurality of addresses.
Figure 4B:
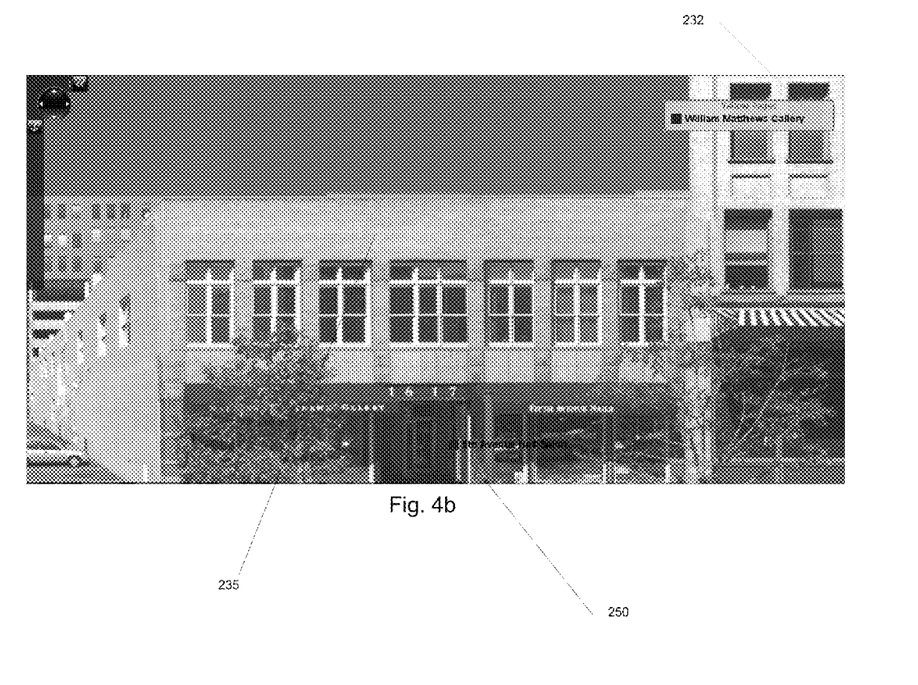
FIG. 4b is a street level view of an address that includes a plurality of entities.

FIGS. 4a-4d illustrate application of one embodiment of the method. In FIG. 4a, a street level 215 view of a plurality of building (objects) 235 240 is shown. In the illustration, a separate window 232 displays icons 245 250 and icon descriptions. The icon descriptions are for entities thought to be in the illustration, somewhere. A user can drag the icon 245 250 to known proper locations for the entities, such as a doorway, a window on an upper floor, etc. FIG. 4b illustrates an icon 245 that has been paced on a doorway of a building 235. The icon 250 is for Fifth Avenue Nails and it can be seen from the awning that Fifth Avenue Nails is in the building 235. The icon has been placed in the doorway into Fifth Avenue Nails. The location of Fifth Avenue Nails may then be stored in a database 205 to be presented on future maps or illustrations.

Figure 4C:
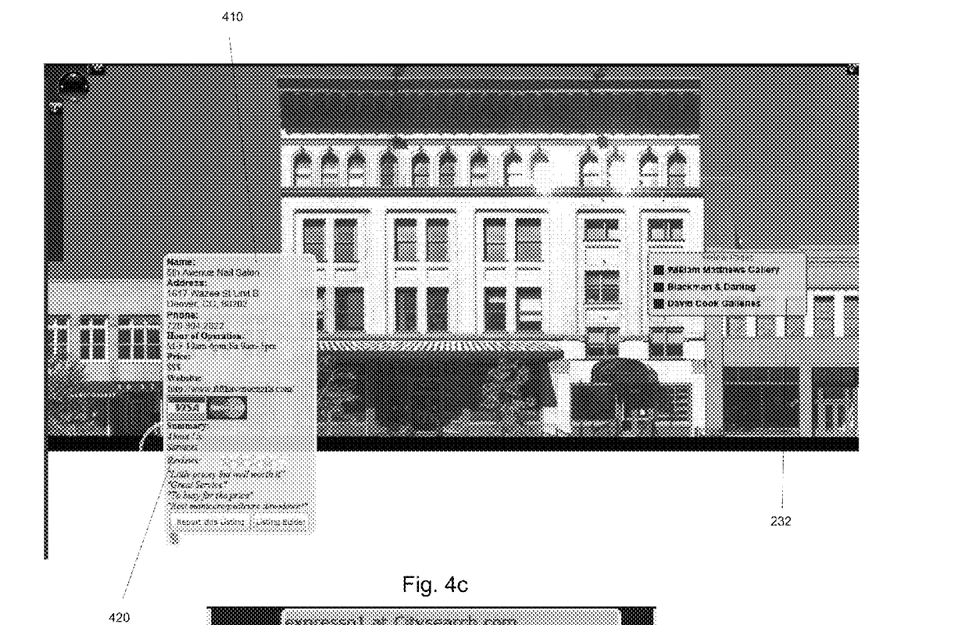
FIG. 4c is a street-level view of a plurality of business listings displaying selected business data corresponding to one of the business listings.
Figure 4D:
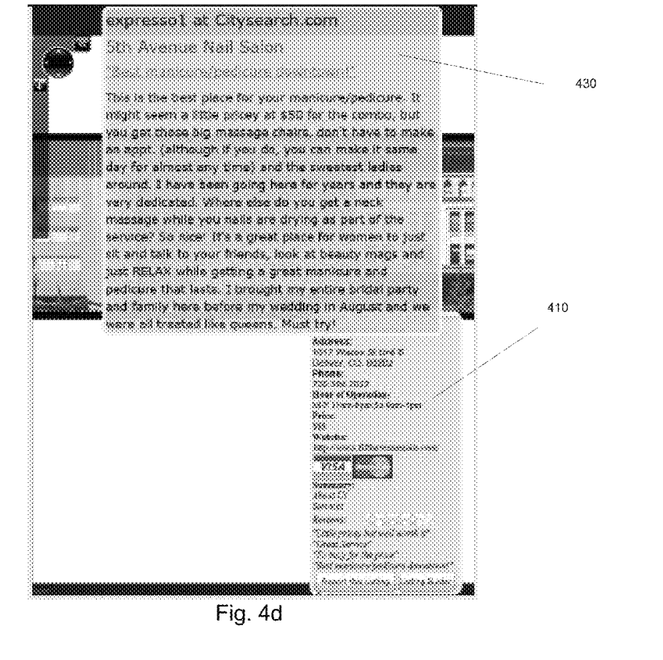
FIG. 4d is a detailed view of the business listing data that displays selected additional business data.

FIG. 4c illustrates an embodiment with a further extension of the method. By hovering or selecting a placed icon 250, additional information 410 about the icon 250 and the related entity may be displayed. The displayed information includes what credit card are accepted, the URL for the business, how to contact the business, etc. In use, the user can find most, if not all, desired information by simply selecting or hovering over a placed icon 245 250. If more information is desired about a particular topic covered in the summary description in FIG. 4c, hovering or selecting a topic 420 in the summary description (such as Reviews) will result in additional detail 430 regarding the selected topic.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method for updating a location of an entity via an electronic image, comprising:

illustrating to a user the electronic image of the location at a known view level;

presenting a display area having a plurality of different movable icons in a first separate window on a view of the electronic image, each movable icon, in the first separate window, being displayed with a corresponding entity that describes each movable icon, wherein the first separate window is displayed automatically, on the view of the electronic image, based on at least one entity in the electronic image, when a proper location of the at least one entity is unclear in the electronic image;

allowing the user to place each movable icon of the plurality of different movable icons and the corresponding entity from the first separate window to the proper location on an object from a plurality of objects in the electronic image, the proper location representing the location of the corresponding entity on the object in the electronic image, wherein the plurality of movable icons and the corresponding entities in the first separate window have different proper locations on the object;

determining an updated Geographic Information System (GIS) position of the entity according to the proper location with respect to the electronic image;

storing the updated GIS position of the entity in a memory; and using the updated GIS position of the entity in future electronic images.

2. The method of claim 1, further comprising displaying previously placed movable icons in the proper location on the electronic image.

3. The method of claim 2, wherein if an entity describing a previously placed movable icon is displayed on the electronic image and if the previously placed movable icon is selected, displaying an additional information, in a second separate window, about the entity being represented by the previously placed movable icon that was selected.

4. The method of claim 3, further comprising displaying the additional information in a third separate window wherein selecting a topic covered in the additional information in the second separate window displays additional details of the topic in the third separate window without navigating outside the electronic image.

5. The method of claim 3, wherein the additional information comprises at least one selected from a group comprising:
   a URL for the entity;
   a summary review of the entity;
   contact information for the entity;
   payment option;
   price ranges; and
   summary information for the entity.

6. The method of claim 1, wherein the updated GIS position of the entity is stored based on a significant number of users placing same movable icon at same proper location.

7. The method of claim 6, wherein
one of the plurality of objects comprises a multistory building;
a ray points toward a floor of the multistory building; and
the movable icon being displayed relates to the entity on or near to the floor of the multistory building being pointed to by the ray.

8. The method of claim 6, wherein each of the plurality of objects having numerous entities related to displayed movable icons.

9. The method of claim 8, wherein the first separate window is not movable and the plurality of different movable icons cannot be placed outside the view of the electronic image.

10. The method of claim 1, wherein the plurality of objects being buildings and the corresponding entity being a business, wherein the first separate window is displayed near the corresponding entity's entry based on a determination that GIS does not include the corresponding entity's front door geolocation.

11. The method of claim 1, wherein the updated GIS position is temporarily stored until a significant number of unknown users validate the updated GIS position.

12. The method of claim 1, further comprising allowing an authorized user to modify the updated GIS position stored in a database immediately.

13. A computer system comprising a processor physically configured to execute computer executable instructions, a memory physically configured to store computer executable instructions and an input/output circuit, the computer executable instructions comprising instructions for updating a location of an entity via an electronic image view, the computer executable instructions comprising instructions for:
illustrating to a user the electronic image view of the location at a view level;
presenting a movable icon and the entity in a separate window on the electronic image view, wherein the separate window is displayed automatically based on entities in the electronic image view when a proper location of one or more corresponding entities is unclear in the electronic image view;
allowing the user to relocate both the movable icon and the entity from the separate window to the proper location on the electronic image view, the proper location representing location corresponding to the entry of the entity with regard to the electronic image view;
determining an updated Geographic Information System (GIS) position of the entity according to the proper location with regard to the electronic image view, wherein the updated GIS position is determined using a depth map created based on a determination of the view level;
storing the updated GIS position of the entity in a memory; and
using the updated GIS position of the entity in future electronic images.

14. The computer system of claim 13, further comprising computer executable instructions for displaying previously placed movable icons in the proper location on the electronic image view.

15. The computer system of claim 14, further comprising if a previously placed movable icon is selected, computer executable instructions for displaying an additional information about the entity being represented by the previously placed movable icon that was selected, the additional information being displayed in an additional window.

16. The computer system of claim 15, wherein the additional information comprises at least one selected from a group comprising:
a URL for the entity;
a summary review of the entity;
contact information for the entity;
payment option;
price ranges; and
summary information for the entity.

17. The computer system of claim 13, wherein the electronic image view comprises the plurality of objects, the plurality of objects being buildings and the entity being a business, each of the plurality of objects having numerous entities related to displayed movable icons.

18. The computer system of claim 17, wherein:
one of the plurality of objects comprises a multistory building;
a ray points toward a floor of the multistory building; and
the movable icon being displayed relates to the entity on or near to the floor of the multistory building being pointed to by the ray.

19. A computer storage medium physically configured according to computer executable instructions for updating a location of an entity according to an electronic image view, the computer executable instructions comprising instructions for:
illustrating to a user the electronic image view of the location at a known view level;
displaying a plurality of movable icons and a plurality of entities in a separate window on the electronic image view when a proper location of the at least one entity is unclear in the electronic image, each of the plurality of movable icons corresponding to one of the plurality of entities known to be located within area displayed by the electronic image view;
enabling the user to drag both a first movable icon and a corresponding entity from the separate window to a proper location on the electronic image view, the proper location representing a position of the corresponding entity at a sub address with regard to an address in the electronic image view, wherein the plurality of entities are placed to separate proper locations at the same address;
determining an update Geographic Information System (GIS) position of the corresponding entity according to the proper location of the first movable icon in the electronic image view;
storing the update GIS position of the corresponding entity in a memory;
upon receiving a selection of the first movable icon after the user placed the first movable icon at the proper location, displaying additional information about the corresponding entity, the additional information being displayed in an additional window; and
using the update GIS position of the entity in future electronic images.

20. The computer storage medium of claim 19, wherein the additional information comprises at least one selected from a group comprising:
a URL for the entity;
a summary review of the entity;
contact information for the entity;
payment option;
price ranges; and
summary information for the entity.

* * * * *